United States Patent
Lowell et al.

(10) Patent No.: US 11,803,734 B2
(45) Date of Patent: Oct. 31, 2023

(54) ADAPTIVE QUANTIZATION FOR NEURAL NETWORKS

(71) Applicant: Advanced Micro Devices, Inc., Santa Clara, CA (US)

(72) Inventors: Daniel I. Lowell, Austin, TX (US); Sergey Voronov, Chapel Hill, NC (US); Mayank Daga, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 1561 days.

(21) Appl. No.: 15/849,617

(22) Filed: Dec. 20, 2017

(65) Prior Publication Data

US 2019/0188557 A1  Jun. 20, 2019

(51) Int. Cl.
*G06N 3/063* (2023.01)
*G06N 3/08* (2023.01)

(52) U.S. Cl.
CPC ............. *G06N 3/063* (2013.01); *G06N 3/08* (2013.01)

(58) Field of Classification Search
CPC ............ G06N 3/063; G06N 3/08; G06N 3/04; G06N 3/082; G06N 20/00
USPC .......................................................... 706/25
See application file for complete search history.

(56) References Cited

U.S. PATENT DOCUMENTS

| | | | | |
|---|---|---|---|---|
| 5,448,681 A * | 9/1995 | Khan | ................ | G05B 13/027 |
| | | | | 706/23 |
| 10,229,356 B1 * | 3/2019 | Liu | .................. | G06N 3/084 |
| 10,373,050 B2 * | 8/2019 | Lin | .................... | G06N 3/084 |
| 10,417,525 B2 * | 9/2019 | Ji | ..................... | G06K 9/6232 |
| 10,789,734 B2 * | 9/2020 | Pan | ................... | G06K 9/6262 |
| 11,049,006 B2 * | 6/2021 | Langford | ............ | G06N 3/04 |
| 2016/0328646 A1 * | 11/2016 | Lin | ................... | G06K 9/4628 |
| 2018/0285736 A1 * | 10/2018 | Baum | ................ | G06F 7/523 |
| 2019/0050710 A1 * | 2/2019 | Wang | ................ | G06N 3/063 |

OTHER PUBLICATIONS

Ko et al. "Adaptive Weight Compression for Memory-Efficient Neural Networks", 2017 Design, Automation and Test in Europe, Mar. 27-31, 2017 (Year: 2017).*

Xu et al. "Design Interpretable Neural Network Trees Through Self-Organized Learning of Features", IEEE International 2004 (Year: 2004).*

(Continued)

*Primary Examiner* — Viker A Lamardo
(74) *Attorney, Agent, or Firm* — Volpe Koenig

(57) ABSTRACT

Methods, devices, systems, and instructions for adaptive quantization in an artificial neural network (ANN) calculate a distribution of ANN information; select a quantization function from a set of quantization functions based on the distribution; apply the quantization function to the ANN information to generate quantized ANN information; load the quantized ANN information into the ANN; and generate an output based on the quantized ANN information. Some examples recalculate the distribution of ANN information and reselect the quantization function from the set of quantization functions based on the resampled distribution if the output does not sufficiently correlate with a known correct output. In some examples, the ANN information includes a set of training data. In some examples, the ANN information includes a plurality of link weights.

23 Claims, 9 Drawing Sheets

(56) References Cited

OTHER PUBLICATIONS

Khomenko, V. et al., "Accelerating Recurrent Neural Network Training using Sequence Bucketing and Multi-GPU Data Parallelization", IEEE First International Conference on Data Stream Mining & Processing, Aug. 23-27, 2016, pp. 100-103, IEEE, Lviv, Ukraine.

Na, T. et al., "Speeding up Convolutional Neural Network Training with Dynamic Precision Scaling and Flexible Multiplier-Accumulator", Proceedings of the 2016 International Symposium on Low Power Electronics and Design, Aug. 8-10, 2016, pp. 58-63, ACM, San Francisco, CA, USA.

Rastegari, M. et al., "XNOR-Net: ImageNet Classification Using Binary Convolutional Neural Networks", Proceedings of 14th European Conference on Computer Vision—ECCV 2016, Lecture Notes in Computer Science, Oct. 11-14, 2016, pp. 525-542, Springer, Amsterdam, The Netherlands.

Hubara, I. et al., "Quantized Neural Networks: Training Neural Networks with Low Precision Weights and Activations", arXiv:1609.07061v1, (Sep. 22, 2016).

Iandola, F. et al., "Firecaffe: near-linear acceleration of deep neural network training on compute clusters", Proceedings of the IEEE Conference on Computer Vision and Pattern Recognition, Jun. 26-Jul. 1, 2016, pp. 1-13, IEEE, Las Vegas, NV, USA.

Abadi, M. et al., "TensorFlow: Large-Scale Machine Learning on Heterogeneous Distributed Systems", Preliminary White Paper, Nov. 9, 2015, 19 pgs., TensorFlow, available at: https://www.tensorflow.org/about/bib.

Simonyan, K. et al., "Very Deep Convolutional Networks for Large-Scale Image Recognition", arXiv:1409.1556v6, (Sep. 2014).

Gupta, S. et al., "Deep Learning with Limited Numerical Precision", Proceedings of the 32nd International Conference on Machine Learning, Jul. 6-11, 2015, 10 pgs., vol. 37, Lille, FR.

Dettmers, T., "8-Bit Approximations for Parallelism in Deep Learning", arXiv:1511.04561v4 (Nov. 2015).

* cited by examiner

ADAPTIVE QUANTIZATION FOR NEURAL NETWORKS

BACKGROUND

An artificial neural network (ANN) is a computing device or system inspired by the way a biological nervous system, such as a brain, processes information. An example ANN includes an interconnected group of nodes (i.e., artificial neurons). The nodes are interconnected by links. Each node can receive input data, perform operations on the data, and pass the results on to other nodes. The output of a node can be referred to as its activation, or node value. Each of the links is associated with a weight. The ANN can be trained by inputting a training data set, having a known correct output, to generate an output. The difference between the generated output and the known correct output, if any, known as the training error, can be used to adjust the weights. This procedure can be performed iteratively to converge on an optimized weighting for the ANN based on that training data set.

BRIEF DESCRIPTION OF THE DRAWINGS

A more detailed understanding can be had from the following description, given by way of example in conjunction with the accompanying drawings wherein.

DETAILED DESCRIPTION

Figure 1:
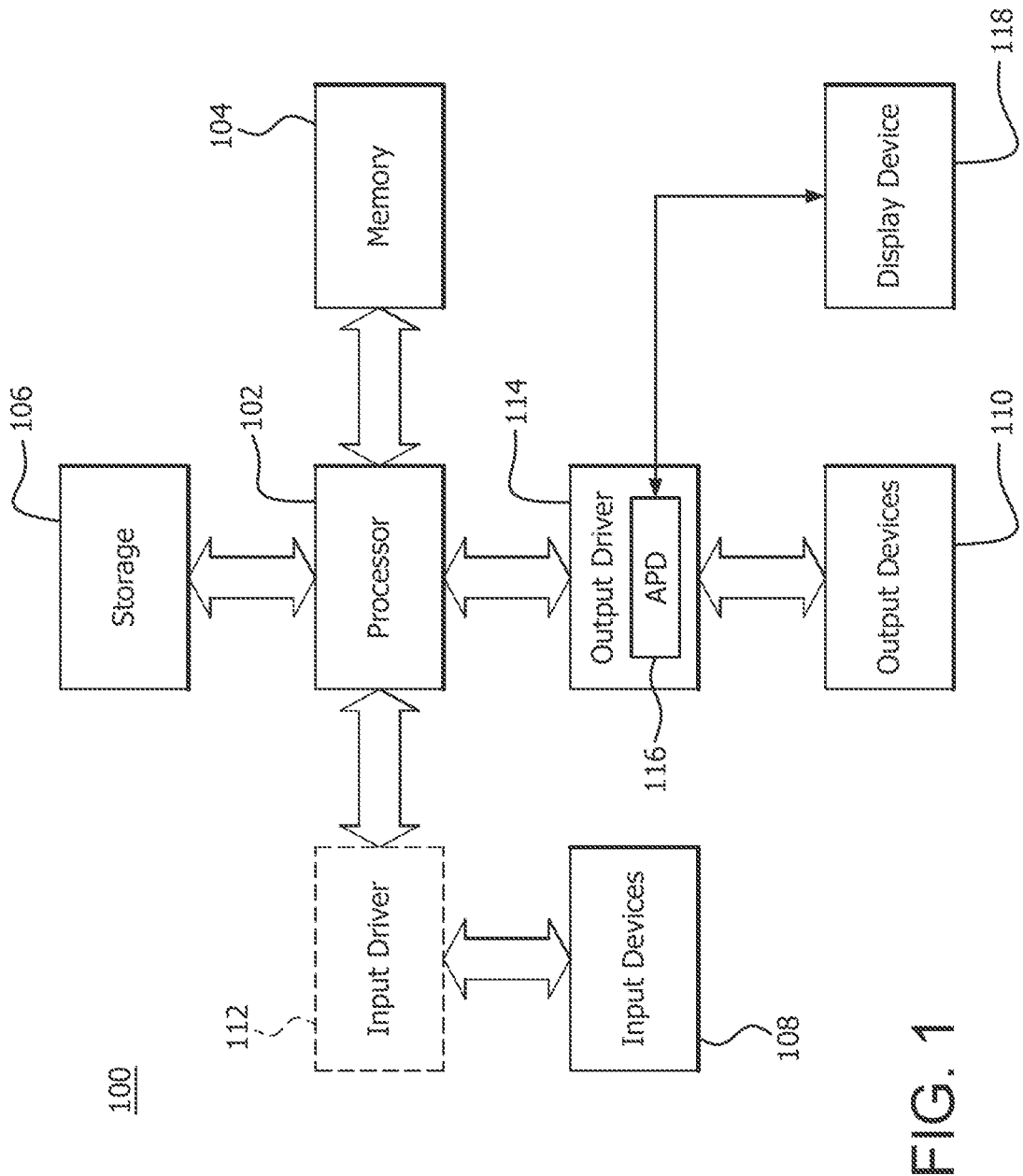
FIG. 1 is a block diagram of an example device in which one or more features of the disclosure can be implemented.

Some examples provide a processor configured for adaptive quantization in an artificial neural network (ANN). The processor includes circuitry to calculate a distribution of ANN information; circuitry to select a quantization function from a set of quantization functions based on the distribution; circuitry to apply the quantization function to the ANN information to generate quantized ANN information; circuitry to load the quantized ANN information into the ANN; and circuitry to generate an output based on the quantized ANN information.

In some examples, the processor includes circuitry to recalculate the distribution of ANN information and reselect the quantization function from the set of quantization functions based on the recalculated distribution, if the output does not sufficiently correlate with a known correct output. In some examples, the ANN information includes a set of training data. In some examples, the ANN information includes a plurality of link weights. In some examples, the processor includes circuitry to calculate a distribution of link weights for each of a plurality of layers of the ANN; select a quantization function to the plurality of link weights for each of the plurality of layers of the ANN based on each distribution; and apply the respective quantization function to the link weights for each of the plurality of layers. In some examples, the processor includes circuitry to calculate a distribution of link weights for each of a plurality of subsets of layers of the ANN; select a quantization function to the plurality of link weights for each of the plurality of subsets of layers of the ANN based on each distribution; and apply the respective quantization function to the link weights for each of the plurality of subsets of layers.

Some examples provide a method for adaptive quantization in an ANN. The method includes calculating a distribution of ANN information; selecting a quantization function from a set of quantization functions based on the distribution; applying the quantization function to the ANN information to generate quantized ANN information; loading the quantized ANN information into the ANN; and generating an output based on the quantized ANN information.

In some examples, the method includes recalculating the distribution of ANN information and reselecting the quantization function from the set of quantization functions based on the recalculated distribution, if the output does not sufficiently correlate with a known correct output. In some examples, the ANN information includes a set of training data. In some examples, the ANN information includes a plurality of link weights. In some examples, the method includes calculating a distribution of link weights for each of a plurality of layers of the ANN; selecting a quantization function to the plurality of link weights for each of the plurality of layers of the ANN based on each distribution; and applying the respective quantization function to the link weights for each of the plurality of layers. In some examples, the method includes calculating a distribution of link weights for each of a plurality of subsets of layers of the ANN; selecting a quantization function to the plurality of link weights for each of the plurality of subsets of layers of the ANN based on each distribution; and applying the respective quantization function to the link weights for each of the plurality of subsets of layers.

Some examples provide a non-transitory computer-readable medium with instructions which when executed by a processor implementing an ANN, cause circuitry of the processor to calculate a distribution of ANN information; select a quantization function from a set of quantization functions based on the distribution; apply the quantization function to the ANN information to generate quantized ANN information; load the quantized ANN information into the ANN; and generate an output based on the quantized ANN information.

In some examples, the instructions cause circuitry of the processor to recalculate the distribution of ANN information and reselect the quantization function from the set of quantization functions based on the recalculated distribution, if the output does not sufficiently correlate with a known correct output. In some examples, the ANN information includes a set of training data. In some examples, the ANN information includes a plurality of link weights. In some examples, the instructions cause circuitry of the processor to calculate a distribution of link weights for each of a plurality of layers of the ANN; select a quantization function to the plurality of link weights for each of the plurality of layers of the ANN based on each distribution; and apply the respective quantization function to the link weights for each of the plurality of layers. In some examples, the instructions cause circuitry of the processor to calculate a distribution of link weights for each of a plurality of subsets of layers of the ANN; select a quantization function to the plurality of link weights for each of the plurality of subsets of layers of the ANN based on each distribution; and apply the respective quantization function to the link weights for each of the plurality of subsets of layers.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm perform the functionality described herein.

Figure 2:
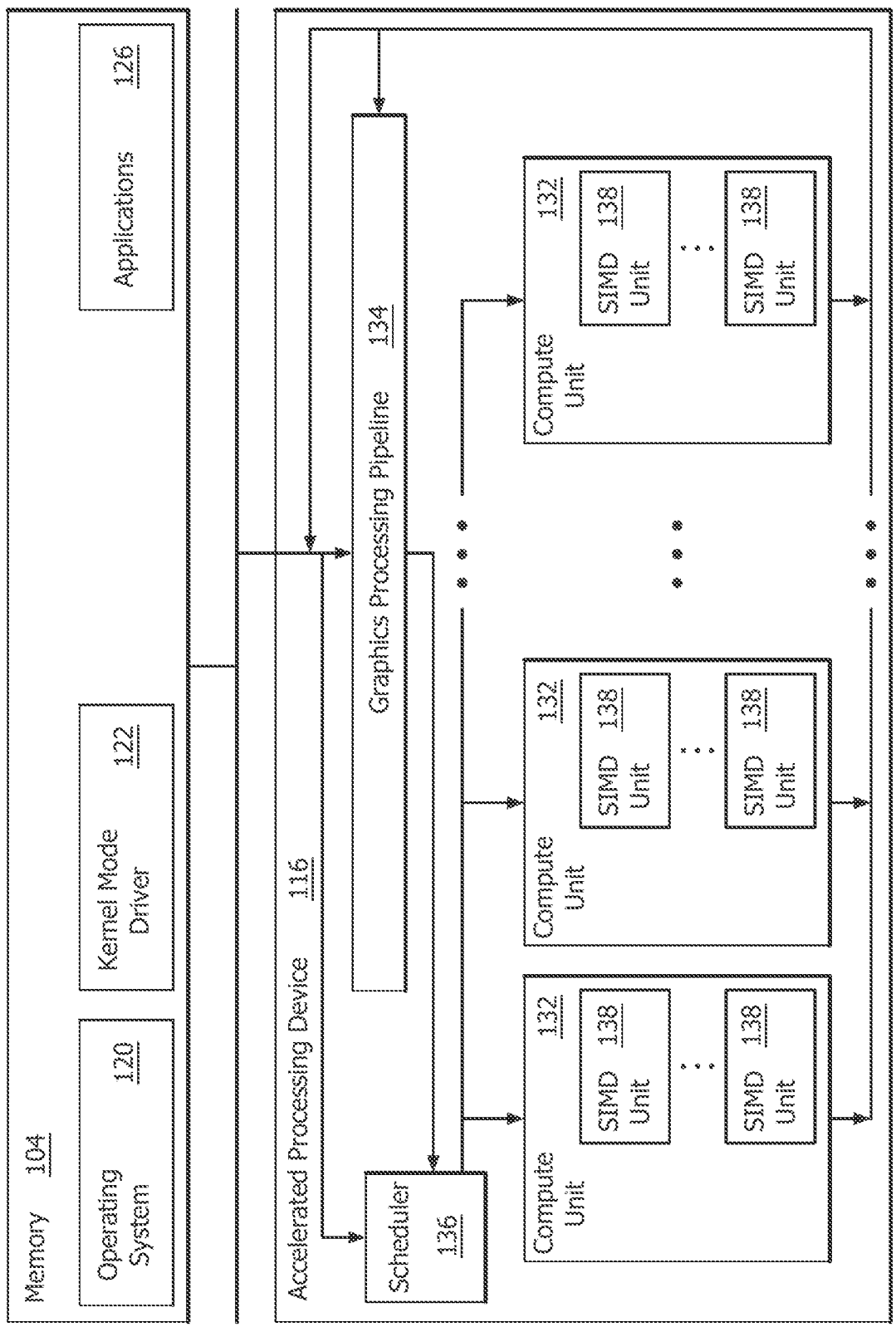
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel. In some instances, graphics pipeline 134 is omitted.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
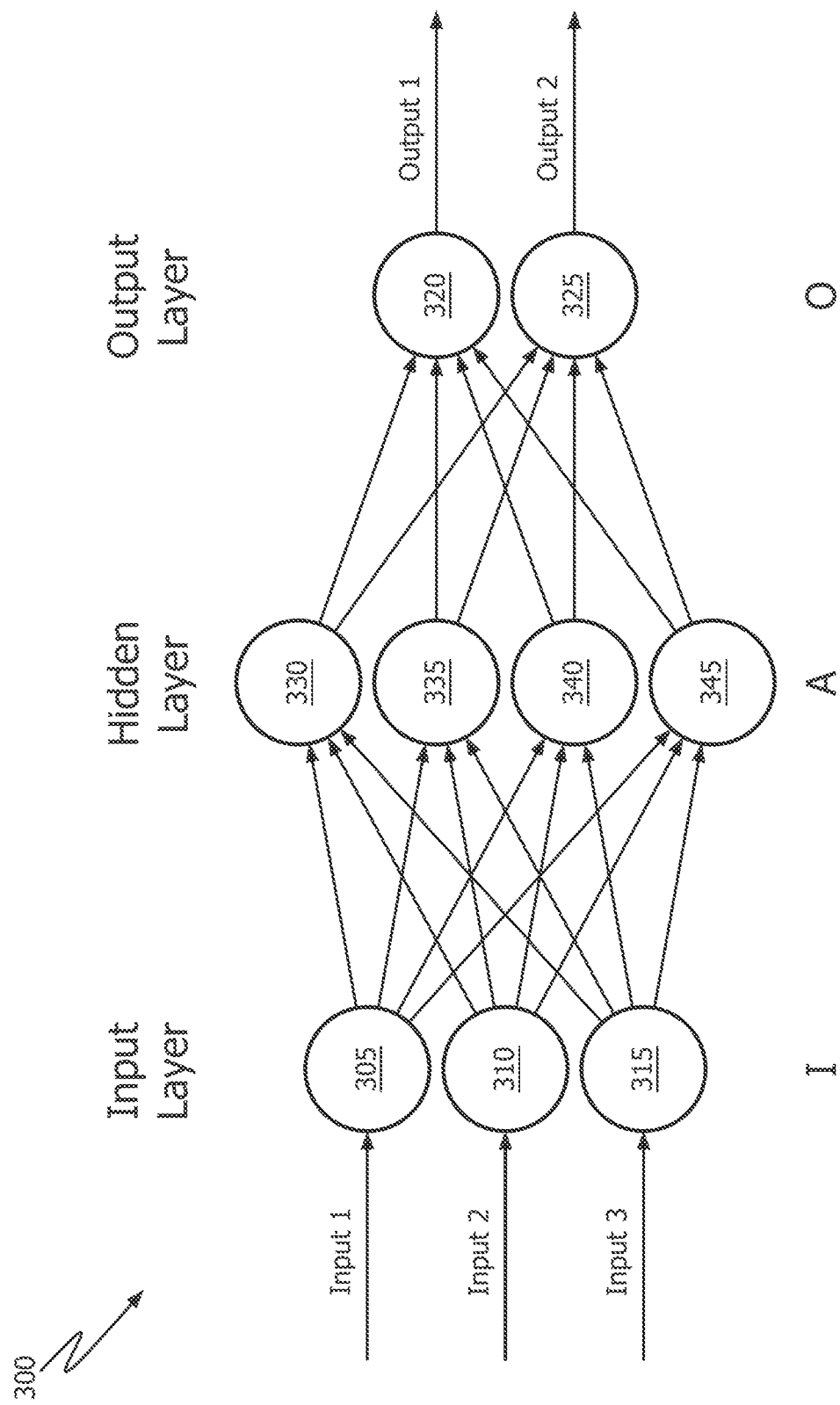
FIG. 3 is a schematic diagram illustrating an example ANN.

FIG. 3 is a schematic diagram illustrating an example ANN 300. ANN 300 includes a plurality of nodes such as input nodes 305, 310, 315 output nodes 320, 325, and hidden nodes 330, 335, 340, 345.

Example ANN 300 is organized into layers, including an input layer I, an output layer O, and a hidden (i.e., not input or output) layer A. Input layer I includes input nodes 305, 310, 315. Output layer O includes output nodes 320, 325. Hidden layer A includes hidden nodes 330, 335, 340, 345. In this context, describing a node or layer as hidden means that it is both input to and output from only by other nodes of the ANN, unlike input nodes and output nodes, which have a regular input or output interface with components outside of the ANN. A layer which outputs to or inputs from another layer can be described as logically adjacent to that layer. For example, in ANN 300, hidden layer A can be described as logically adjacent to input layer I and to output layer O. Logical adjacency in this context neither requires nor excludes physical adjacency.

The input, output, and hidden layers are interconnected by various links as shown in FIG. 3. In the example of ANN 300 each node shares a link with each node in its logically adjacent layers. The topology of ANN 300 is only one example, and it is noted that an ANN can be arranged in any suitable topology. For example, an ANN may instead include a different number of hidden layers, different numbers of input and/or output nodes, and/or different numbers and/or arrangements of links. ANN 300 is shown as having only one hidden layer, however the techniques described herein can also be applied to deep neural networks (i.e., having more than one hidden layer). It is noted that in other ANNs, each node need not share a link with each node in its logically adjacent layers.

Each of the hidden nodes of ANN 300 receives data from one or more preceding (i.e., closer to the input layer) nodes in a logically adjacent layer via a link, and outputs data to one or more succeeding (i.e., closer to the output layer) nodes in a logically adjacent layer via a link. For example, hidden node 330 inputs data from each of input nodes 305, 310, 315 via corresponding links, and outputs data to each of output nodes 320, 325 via corresponding links.

Each node processes its input data according to a function, which can be referred to as an activation function of the node. Each of the links is associated with a weight by which the data passing over that link is weighted (e.g., multiplied) before it is input to the activation function. For example, the data input to hidden node 330 is weighted according to the link weight of each corresponding input link from input nodes 305, 310, 315. Thus, if the link weight of the link from input node 305 is other than 1, the data will be modified based on the link weight before it is processed by the activation function of hidden node 330. If the link weight of the link from input node 310 differs from the link weight of the link from input node 305, the data from each of the input nodes will be weighted differently before it is processed by the activation function of hidden node 320. Similarly, the data output from hidden node 330 to each of output nodes 320, 325 of output layer O is weighted according to each corresponding output link.

Hidden node 330 processes the data input from input nodes 305, 310, 315, as weighted by the corresponding link weights, according to its activation function to generate output data. This output data from hidden node 320 is in turn input by output nodes 320, 325 of output layer O, as weighted by the link weights associated with the corresponding links. Based on the activation functions of each of the nodes and the link weights of each of the links in ANN 300, an output is generated at output nodes 320, 325 based on data input to input nodes 305, 310, 315.

The nodes of ANN 300 can be implemented on any suitable processing device or devices, such as APD 116 as shown and described with respect to FIGS. 1 and 2. For example, all layers of ANN 300 can be implemented on a single compute unit 132 of APD 116. Alternatively, each layer can be implemented on a different compute unit 132 of APD 116, or subsets of layers of ANN 300 can be implemented on different compute units 132 of APD 116. Compute units 132 are shown as incorporating various SIMD units 132, however it is noted that other kinds of compute units, e.g., which do not incorporate SIMD units, may be used in other implementations.

ANN 300 can be trained in any suitable way. In this example, ANN 300 is trained by inputting a training data set to the input layer I, and comparing the resulting output at the output layer O with a known correct output for the training data set. The difference between the output generated by ANN 300 and the known correct output is quantified or otherwise characterized (e.g., using a cost function), and the difference is known as the training loss. This difference is used to adjust the ANN. Such adjustments include altering link weights of one or more of the links. It is noted that in other examples, other kinds of adjustments may be performed, such as altering activation functions of one or more of the nodes. The training process iterates until the difference, i.e., the training loss is acceptably reduced (e.g., below a threshold). Each iteration of such training can be referred to as an epoch. This particular type of training can be referred to as back propagation training. Back propagation training is only one example way in which ANN 300 can be trained; any suitable training techniques may be used to train ANN 300.

Various factors contribute to the amount of time required for training ANN 300. Such factors include the time needed to perform operations on data (e.g., by activation functions in each node, or to apply weights to the data), and time needed to transfer data, weights, or other information over the communications channels associated with the ANN (e.g., via links between nodes).

With respect to data operations, the time needed to input data into the input layer, and perform operations on the data at each node (e.g., activation functions) is affected by the instruction set architecture of the hardware. For example, if ANN 300 is implemented using hardware capable of 32 bit floating point precision data, and if the data is represented at full precision, the time to load the data is affected by the speed of 32 bit floating point load instructions on that hardware.

Further, if the link weights are represented at full precision (e.g., 32 bit floating point), the time to load data output from the input layer to the first hidden layer, or output from the first hidden layer to the second hidden layer for example, is affected by the speed of 32 bit floating multiply instructions on that hardware which are used to apply the link weight to the input data. The time to load or update the link weights into their respective registers or other storage may also be affected by the speed of the 32 bit floating load instruction.

With respect to transfer of weights, data, or other information over the communications channels of ANN 300, the time needed to transfer information among the nodes is affected by the width of the information relative to the bandwidth of the links and other channels. For example, if data is transmitted at full precision (e.g., 32 bit) over a link between nodes, the time needed to transfer the data between nodes is affected by the speed at which the link is capable of transferring 32 bit floating point data. This can have a significant impact on training time in implementations where a single layer of ANN 300 is implemented on different cores or devices, and link weights are synchronized among the cores or devices, or where data is transferred from a node in a first layer to a node in a second layer where the first and second layers are implemented in separate devices, for example, different cores or chips.

Under some circumstances it is not necessary to leverage the full precision capability of the hardware for training ANN 300. For example, the ANN data (e.g., data input to the input nodes, data input to and output from the hidden nodes, etc.) and/or link weights may be capable of quantization. By quantizing this information, it may be possible to reduce its bit width to the point where lower precision instructions can be used. For example, based the quantization it may be possible to use 16, or 8 bit floating point instructions in a system where full precision is 32 bit. If lower precision instructions (e.g., 16 bit or 8 bit floating point) are faster to execute than the full precision instructions (e.g., 32 bit floating point) and/or if lower precision data (e.g., 16 bit or 8 bit) can be transferred over the communications channels of the ANN faster than full precision data (e.g., 32 bit), it may take less time to train ANN 300 using quantized data than by using unquantized data.

Various approaches can be used to quantize ANN data. In an example approach, the training data set is analyzed to determine the numerical distribution of its data values. Depending on the numerical distribution, a suitable quantization function (e.g., a function selected to fit the distribution) is applied to transform the training data into a quantized space that requires fewer bits to represent than would be required to represent the unquantized training data. Selecting the most appropriate quantization function from a set of possible quantization functions in this manner can be referred to as adaptive quantization. Because the same training data set is input for each epoch of the ANN training, quantization of this data is done only once. Applying the same quantization function for each epoch can be referred to as static quantization. The entire training data set, a subset of the training data set, a representative sample of the training data set, or any other suitable sampling of the training data set can be analyzed to determine the distribution, e.g., depending upon the desired level of accuracy of the quantization. Sampling may be performed by APD 116, one or more compute units 132, processor 102, or any other suitable device.

The link weights can also be quantized. In this approach, the link weights are analyzed to determine a distribution of their values. Depending on the distribution of the values, a quantization function (e.g., the closest fitting function from a selection of possible quantization functions) that accurately represents the most salient values in the numerical distribution is applied to transform the link weights into a quantized space that requires fewer bits to represent than would be required to represent the unquantized link weights. Because at least some of the link weights are changed for each epoch of the ANN training, quantization of this data can be done more than once during the training (e.g., each epoch). Resampling the link weights and determining a quantization function potentially more than once during the training can be referred to as dynamic quantization. Some quantization functions may better represent the link weights (or other data) than others. Accordingly, adjusting the quantization (e.g., to select a different quantization function from a selection of possible quantization functions to better fit the distribution of link weights (or other data)) can be referred to as adaptive quantization. Quantization may be performed by APD 116, one or more compute units 132, processor 102, or any other suitable device.

Rather than determining a single quantization function for all link weights in ANN 300, quantization can be performed on a per-layer basis, or for each subset of a plurality of subsets of layers. For example, the link weights for links input to the hidden nodes 330, 335, 340, 345 of hidden layer A can be sampled and a distribution of these link weights can be calculated. A quantization function can be selected based on the distribution, and the link weights for links input to the nodes of hidden layer A can be quantized based on this quantization function. The link weights can also be sampled and a distribution of these link weights can be calculated for each other layer in ANN 300. The quantization function selected for the link weights of each layer may differ. Selecting a quantization function that is appropriate for each layer can have the advantage of increasing the effectiveness of the link weight quantization in ANN 300 as compared to determining a single quantization function for all link weights. Selecting a quantization function that is appropriate for each of a plurality of subsets of layers can also increase the effectiveness of the link weight quantization in ANN 300 as compared to determining a single quantization function for all link weights, with less complexity than performing quantization per-layer.

Figure 4:
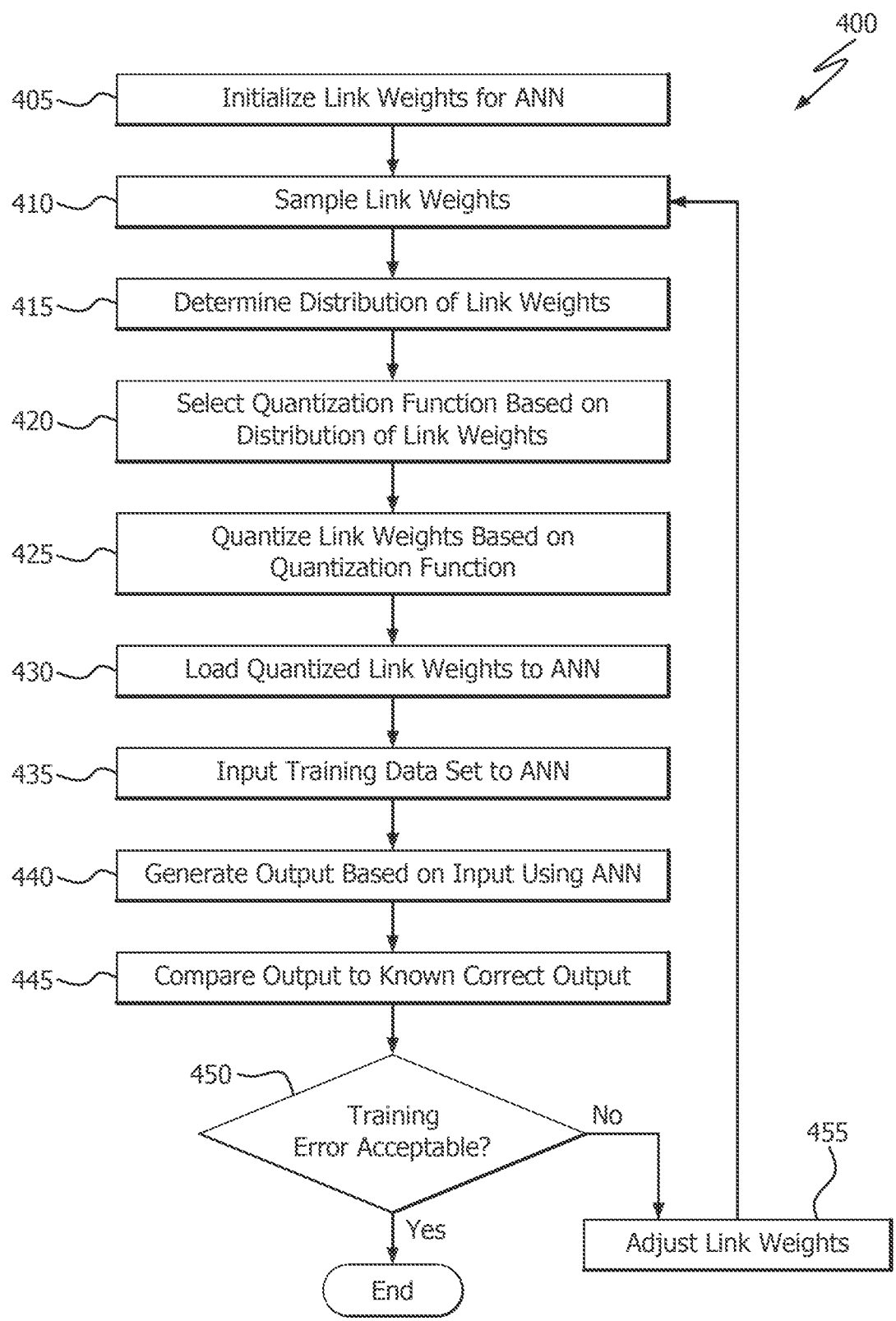
FIG. 4 is a flow chart illustrating an example ANN training method for the ANN of FIG. 3.

FIG. 4 is a flow chart illustrating an example ANN training method 400 which includes dynamic quantization of the link weights in ANN 300. Each step in method 400 is performed by APD 116, one or more compute units 132, processor 102, or any other suitable device. The steps of method 400 may be modified or rearranged according to any of the techniques described herein.

In step 405, the link weights for all layers of ANN 300 are initialized to their initial value for the training. In step 410, the link weights are sampled. All of the link weights for ANN 300 may be sampled, or a representative sample or other sub-sample of the link weights may be taken. In step 415, a distribution of the link weights is calculated based on the sample. In step 420, a quantization function is selected based upon the distribution. The quantization function is selected from a set of possible quantization functions as having the best fit to the distribution. In step 425, the link weights are quantized based on the selected quantization function. In step 430, the quantized link weights are loaded into ANN 300. For example, the quantized link weights may be loaded into registers of APD 116 using load instructions at less than full precision for APD 116. In step 435, the training data set is input to ANN 300. For example, the training data set may be loaded into registers of APD 116 corresponding to nodes of layer I. In step 440, an output is generated based on the training data set and the quantized link weights using ANN 300. In step 445, the output is compared to a known correct output that corresponds to the training data set. The difference between the output and the known correct output can be referred to as the training error. On condition 450 that the training error is acceptable (e.g., the difference is below an acceptable threshold, or a heuristic applied to the output and the known correct output satisfies a desired condition), ANN 300 can be considered to be trained on this training data set. It is noted that in various implementations ANN 300 can be considered to be trained solely on the training error, or based on additional or other considerations. Otherwise, the link weights are adjusted in step 455, and the flow returns to step 410 where the adjusted link weights are sampled. If needed or desired, the adjusted link weights can be dequantized before resampling in step 410, before the distribution is determined in step 415, and/or before they are requantized, potentially using a different quantization function, in step 425. Quantizing the link weights using a different quantization function in an iteration of step 425 can have the advantage of maintaining, increasing and/or optimizing the fidelity of the quantization to the unquantized link weights, e.g., due to a change in their numerical distribution. Method 400 iterates over steps 410-455 until the training error is considered to be acceptable at condition 450.

Figure 5:
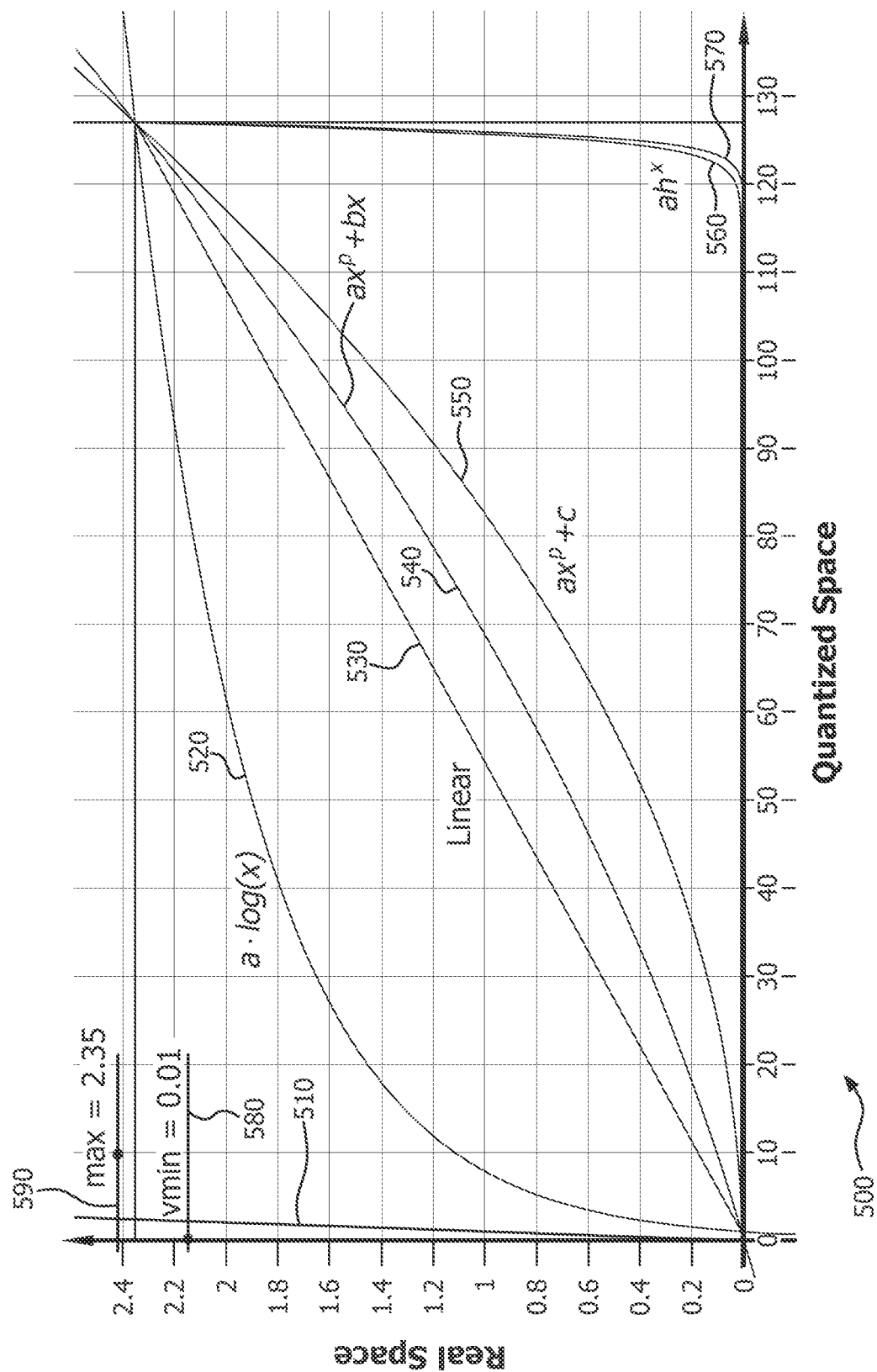
FIG. 5 is a graph illustrating a set of example quantization functions for the ANN of FIG. 3.
Figure 6:
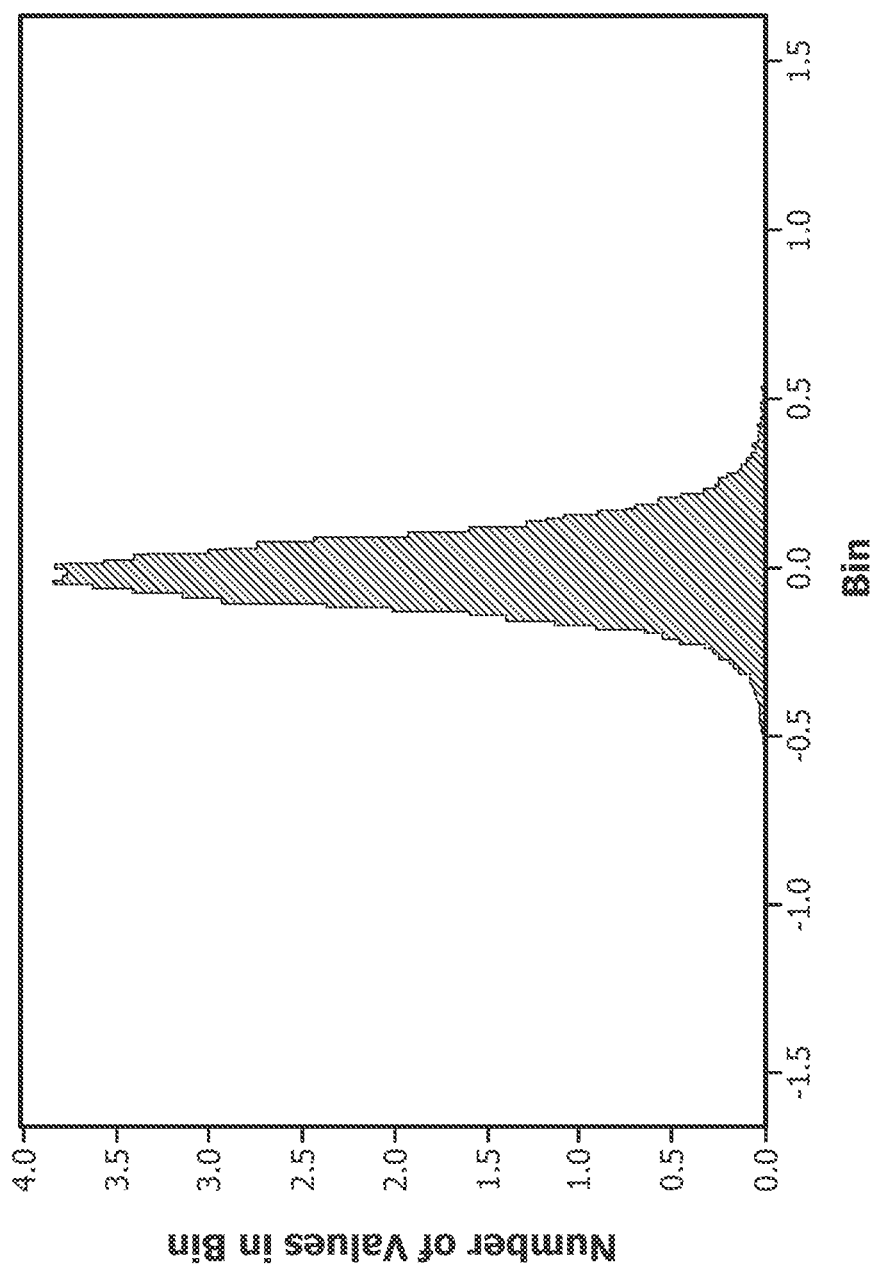
FIG. 6 is a graph illustrating an example distribution of ANN data for the ANN of FIG. 3.

FIG. 5 is a graph 500 illustrating a set of example quantization functions for ANN 300. Graph 500 includes curves 510, 520, 530, 540, 550, 560, and 570 which represent various possible quantization functions. It is noted that any suitable set of possible quantization functions can be used. The set of possible quantization functions can include a variety of functions which approximate and/or are optimized for various possible or anticipated distributions of training data, link weights, or other quantizable information. In the example of FIG. 5, a calculated distribution of the real values for information, such as link weights, for a particular layer falls between bounds 580 and 590. Accordingly, a quantization function corresponding to curve 520 may be selected, which of curves 510, 520, 530, 540, 550, 560, 570, includes the largest number of quantization values for this range of real values. Selecting curve 520 may have the advantage of providing a higher fidelity representation of the unquantized information (depending on its distribution) than a more typical linear quantization function, such as represented by curve 530 for example. FIG. 6 is a graph 600 illustrating an example of a possible distribution of values for training data, link weights, or other quantizable information.

Figure 7:
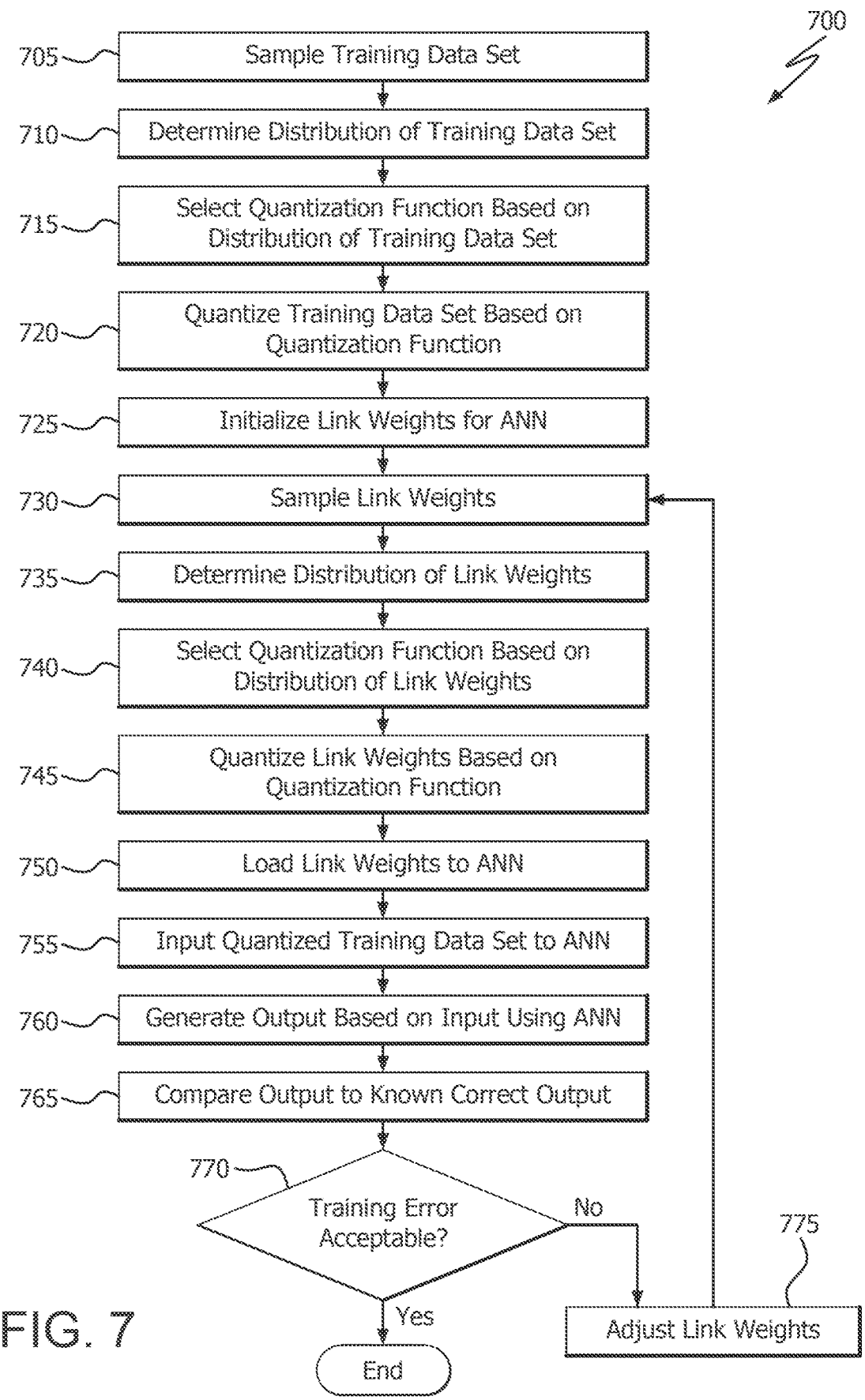
FIG. 7 is a flow chart illustrating another example ANN training method for the ANN of FIG. 3.

FIG. 7 is a flow chart illustrating an example ANN training method 700 which includes both static quantization of ANN training data and dynamic quantization of the link weights in ANN 300. Steps 705-720 correspond to static quantization of the ANN training data, and steps 730-775 correspond to the dynamic quantization of the link weights. Each step in method 700 is performed by APD 116, one or more compute units 132, processor 102, or any other suitable device. The steps of method 700 may be modified or rearranged according to any of the techniques described herein.

In step 705, the training data set is sampled. All of the training data may be sampled, or a representative sample or other sub-sample of the training data may be taken. In step 710, a distribution of the training data is determined based on the sample. In step 715, a quantization function is selected based upon the distribution of the training data set. The quantization function is selected from a set of possible quantization functions as having the best fit to the distribution. In step 720, the training data is quantized based on the selected quantization function.

In step 725, the link weights for all layers of ANN 300 are initialized to their initial value for the training. In step 730, the link weights are sampled. All of the link weights for ANN 300 may be sampled, or a representative sample or other sub-sample of the link weights may be taken. In step 735, a distribution of the link weights is determined based on the sample. In step 740, a quantization function is selected based upon the distribution. The quantization function is selected from a set of possible quantization functions as having the best fit to the distribution. In step 745, the link weights are quantized based on the selected quantization function. In step 750, the quantized link weights are loaded into ANN 300. For example, the quantized link weights may be loaded into registers of APD 116 using load instructions at less than full precision for APD 116. In step 755, the quantized training data set is input to ANN 300. For example, the quantized training data set may be loaded into registers of APD 116 corresponding to nodes of layer I. In step 760, an output is calculated based on the quantized training data set and the quantized link weights using ANN 300. In step 765, the output is compared to a known correct output that corresponds to the training data set. The difference between the output and the known correct output can be referred to as the training error. On condition 770 that the training error is acceptable (e.g., the difference is below an acceptable threshold, or a heuristic applied to the output and the known correct output satisfies a desired condition), ANN 300 can be considered to be sufficiently trained on this training data set. It is noted that in various implementations ANN 300 can be considered to be trained solely on the training error, or based on additional or other considerations. Otherwise, the link weights are adjusted in step 775, and the flow returns to step 730 where the adjusted link weights are sampled. If needed or desired, the adjusted link weights can be dequantized before resampling in step 730, before the distribution is determined in step 735 and/or before they are requantized, potentially using a different quantization function, in step 740. Quantizing the link weights using a different quantization function in an iteration of step 740 can have the advantage of maintaining, increasing and/or optimizing the fidelity of the quantization to the unquantized link weights, e.g., due to a change in their numerical distribution. Method 700 iterates over steps 730-775 until the training error is considered to be acceptable at condition 770.

Figure 8:
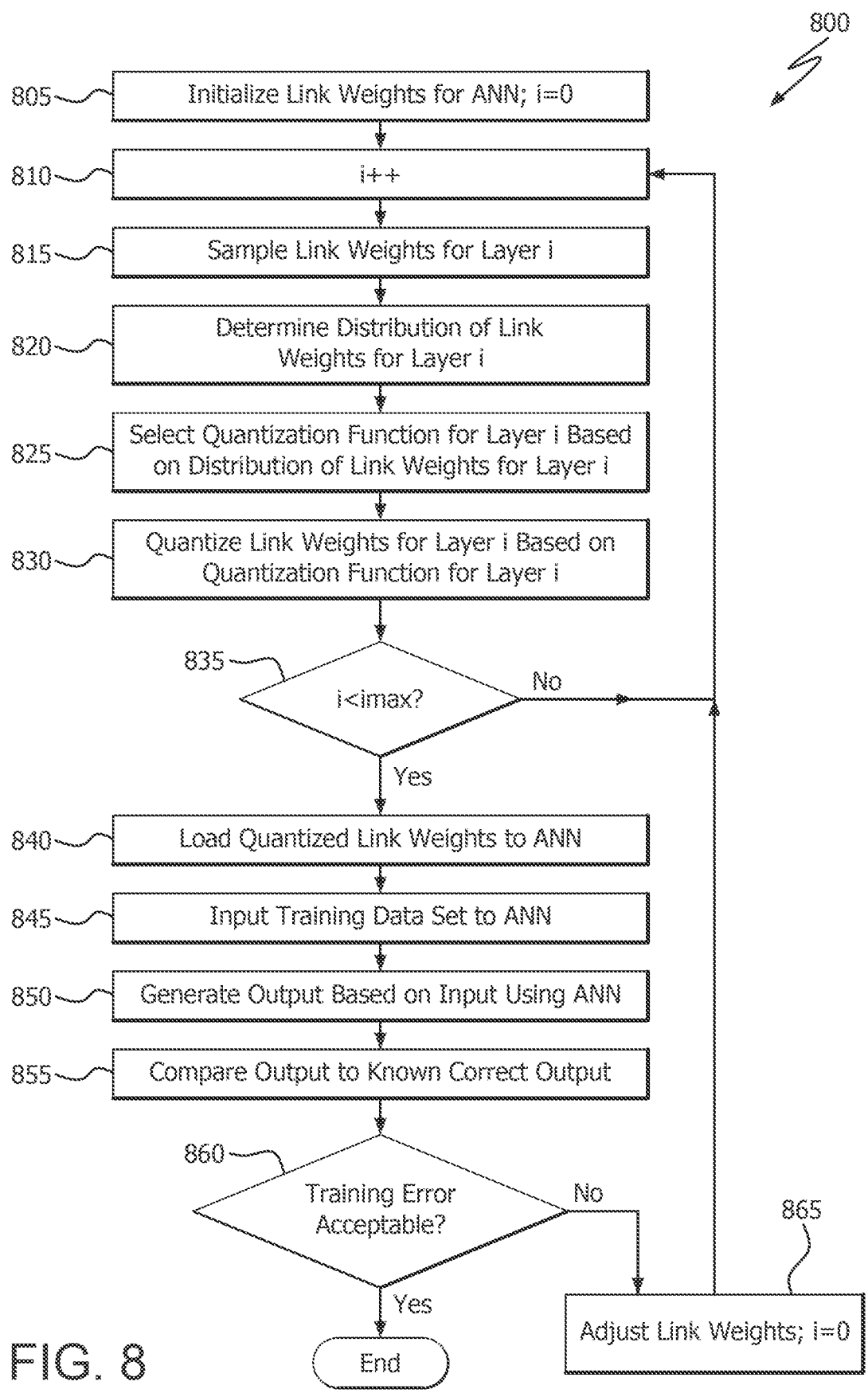
FIG. 8 is a flow chart illustrating another example ANN training method for the ANN of FIG. 3.

FIG. 8 is a flow chart illustrating an example ANN training method 800 which includes dynamic quantization of the link weights in ANN 300 on a per-layer basis. Each step in method 800 is performed by APD 116, one or more compute units 132, processor 102, or any other suitable device. The steps of method 800 may be modified or rearranged according to any of the techniques described herein.

In step 805, the link weights for all layers of ANN 300 are initialized to their initial value for the training and a loop counter i is initialized to a value of zero. In step 810, the loop counter i is incremented by one. In step 815, the link weights for links input to nodes of the layer corresponding to i are sampled. For example, in ANN 300 the first layer to which link weights are applied is layer I. Accordingly, these link weights correspond to a value of i=1. Similarly, hidden layer A corresponds to a value of i=2, and output layer O corresponds to a value of i=3. All of the link weights for layer i=1 (i.e., input layer I in this example) may be sampled, or a representative sample or other sub-sample of the link weights may be taken. In step 820, a distribution of the link weights for layer i=1 is determined based on the sample. In step 825, a quantization function is selected based upon the distribution. The quantization function is selected from a set of possible quantization functions as having the best fit to the distribution. In step 830, the link weights for layer i=1 are quantized based on the selected quantization function. On a condition 835 that loop counter i is less than the total number of layers to which input link weights are applied, imax, the flow returns to step 810 where loop counter i is incremented. Method 800 iterates over steps 810-835 until the link weights for each of the imax number of layers has been sampled and quantized. On a condition 835 that i is not less than imax, the quantized link weights are loaded into ANN 300 in step 840. For example, the quantized link weights may be loaded into registers of APD 116 using load instructions at less than full precision for APD 116. In step 845, the training data set is input to ANN 300. For example, the training data set may be loaded into registers of APD 116 corresponding to nodes of layer I. In step 850, an output is generated based on the training data set and the quantized link weights using ANN 300. In step 855, the output is compared to a known correct output that corresponds to the training data set. The difference between the output and the known correct output can be referred to as the training error. On condition 860 that the training error is acceptable (e.g., the difference is below an acceptable threshold, or a heuristic applied to the output and the known correct output satisfies a desired condition), ANN 300 can be considered to be sufficiently trained on this training data set. It is noted that in various implementations ANN 300 can be considered to be trained solely on the training error, or based on additional or other considerations. Otherwise, the link weights are adjusted in step 865, the loop counter i is reset to zero, and the flow returns to step 810 where the loop counter is incremented. Method 800 iterates over steps 810-865 until the training error is considered to be acceptable at condition 860. If needed or desired, the adjusted link weights can be dequantized before resampling in step 815, before the distribution is determined in step 820, and/or before they are requantized, potentially using a different quantization function, in step 830. Quantizing the link weights using a different quantization function in an iteration of step 830 can have the advantage of maintaining, increasing and/or optimizing the fidelity of the quantization to the unquantized link weights, e.g., due to a change in their numerical distribution.

Figure 9:
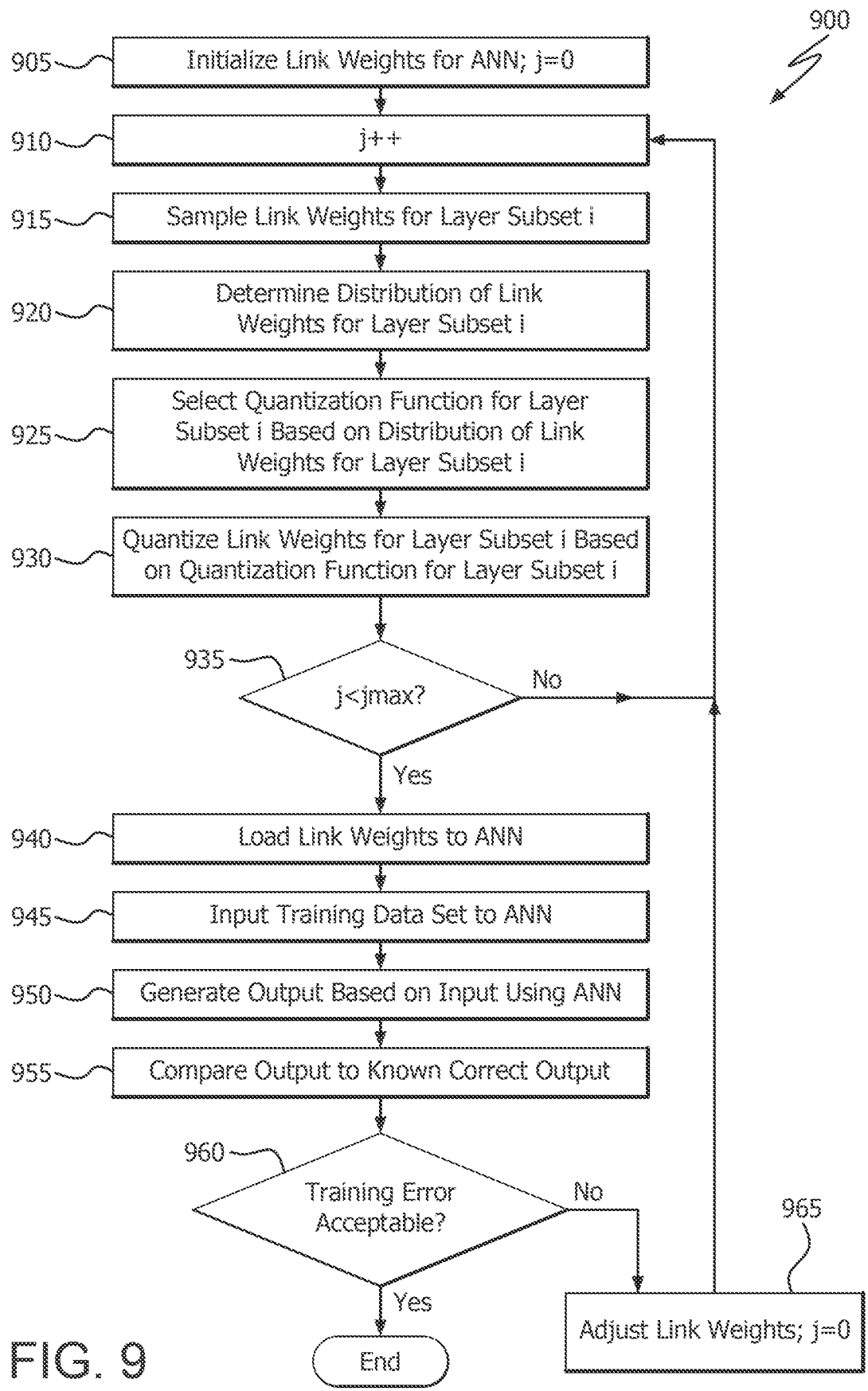
FIG. 9 is a flow chart illustrating another example ANN training method for the ANN of FIG. 3.

FIG. 9 is a flow chart illustrating an example ANN training method 900 which includes dynamic quantization of the link weights in ANN 300 on a per-layer-subset basis. Each step in method 900 is performed by APD 116, one or more compute units 132, processor 102, or any other suitable device. The steps of method 900 may be modified or rearranged according to any of the techniques described herein.

In step 905, the link weights for all layers of ANN 300 are initialized to their initial value for the training and a loop counter j is initialized to a value of zero. In step 910, the loop counter j is incremented by one. In step 815, the link weights for links input to nodes of the subset of layers corresponding to j are sampled. For example, in ANN 300 the first subset of layers to which link weights are applied in ANN 300 includes input layer I and hidden layer A. Accordingly, these link weights correspond to a value of j=1. Similarly, in ANN 300 the second subset of layers to which link weights are applied in ANN 300 includes output layer O. Accordingly, these link weights correspond to a value of j=2. All of the link weights for subset j=1 (i.e., input layer I and hidden layer A in this example) may be sampled, or a representative sample or other sub-sample of the link weights may be taken. In step 920, a distribution of the link weights for subset j=1 is determined based on the sample. In step 925, a quantization function is selected based upon the distribution. The quantization function is selected from a set of possible quantization functions as having the best fit to the distribution. In step 930, the link weights for layer j=1 are quantized based on the selected quantization function. On a condition 935 that loop counter j is less than the total number of layers to which input link weights are applied, jmax, the flow returns to step 910 where loop counter j is incremented, and steps 910-935 iterate until the link weights for each of the jmax number of layers has been sampled and quantized. On a condition 935 that j is not less than jmax, the quantized link weights are loaded into ANN 300 in step 940. For example, the quantized link weights may be loaded into registers of APD 116 using load instructions at less than full precision for APD 116. In step 845, the training data set is input to ANN 300. For example, the training data set may be loaded into registers of APD 116 corresponding to nodes of layer I. In step 950, an output is generated based on the training data set and the quantized link weights using ANN 300. In step 955, the output is compared to a known correct output that corresponds to the training data set. The difference between the output and the known correct output can be referred to as the training error. On condition 960 that the training error is acceptable (e.g., the difference is below an acceptable threshold, or a heuristic applied to the output and the known correct output satisfies a desired condition), ANN 300 can be considered to be trained on this training data set. Otherwise, the link weights are adjusted in step 965, the loop counter j is reset to zero, and the flow returns to step 810 where the loop counter is incremented. Method 900 iterates over steps 910-965 until the training error is considered to be acceptable at condition 960. If needed or desired, the adjusted link weights can be dequantized before resampling in step 915, before the distribution is determined in step 920, and/or before they are requantized, potentially using a different quantization function, in step 930. Quantizing the link weights using a different quantization function in an iteration of step 930 can have the advantage of maintaining, increasing and/or optimizing the fidelity of the quantization to the unquantized link weights, e.g., due to a change in their numerical distribution.

The various example approaches shown and described with respect to FIGS. 4, 7, 8, and 9 may be combined or exchanged during training in some implementations. For example, ANN 300 may move from per-layer quantization to per-subset quantization and/or to full set quantization as desired (e.g., based on the load on APD 116). It is also noted that quantization and/or dequantization can be performed by any appropriate device on which the ANN is implemented. For example, in a case where data and/or link weights are quantized to optimize their transmission from a first layer implemented on a first GPU to a second layer implemented on a second GPU, the first GPU quantizes the data and/or link weights. The second GPU can operate on the data and/or link weights as quantized by the first GPU, or can dequantize or requantize them if the real-space representation or a different quantization of the data and/or link weights would be more optimal. This may be the case, for example, where a full precision instruction on the second GPU is not faster than a reduced precision instruction, and the quantization performed by the first GPU is undesirably reduced in fidelity.

It is understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A processor configured for adaptive quantization in an artificial neural network (ANN), the processor comprising:
   processor circuitry configured to calculate a distribution of ANN information;
   processor circuitry configured to select a quantization function for each layer of the ANN from a set of quantization functions based on the distribution, wherein a first layer of the ANN has a different selected quantization function than a second layer of the ANN;
   processor circuitry configured to apply the quantization function to the ANN information to generate quantized ANN information;
   processor circuitry configured to load the quantized ANN information into the ANN; and
   processor circuitry configured to generate an output based on the quantized ANN information.

2. The processor of claim 1, further comprising processor circuitry configured to, on a condition that the output does not meet an acceptability criterion:
   recalculate the distribution of ANN information; and
   reselect the quantization function from the set of quantization functions based on the recalculated distribution.

3. The processor of claim 1, wherein the ANN information comprises a set of training data.

4. The processor of claim 1, wherein the ANN information comprises a plurality of link weights.

5. The processor of claim 4, further comprising processor circuitry configured to:
   calculate a distribution of link weights for each of a plurality of layers of the ANN;
   select a quantization function to the plurality of link weights for each of the plurality of layers of the ANN based on each distribution; and
   apply the respective quantization function to the link weights for each of the plurality of layers.

6. The processor of claim 4, further comprising processor circuitry configured to:
   calculate a distribution of link weights for each of a plurality of subsets of layers of the ANN;
   select a quantization function to the plurality of link weights for each of the plurality of subsets of layers of the ANN based on each distribution; and
   apply the respective quantization function to the link weights for each of the plurality of subsets of layers.

7. The processor of claim 1, further comprising processor circuitry configured to apply a heuristic to the output and a known correct output, and on a condition that the heuristic is satisfied, to:
   recalculate the distribution of ANN information; and
   reselect the quantization function from the set of quantization functions based on the recalculated distribution.

8. The processor of claim 1, wherein the different selected quantization function is selected for a group of layers which includes the first layer.

9. A method for adaptive quantization in an artificial neural network (ANN), comprising:
   calculating a distribution of ANN information;
   selecting a quantization function for each layer of the ANN from a set of quantization functions based on the distribution, wherein a first layer of the ANN has a different selected quantization function than a second layer of the ANN;
   applying the quantization function to the ANN information to generate quantized ANN information;
   loading the quantized ANN information into the ANN; and
   generating an output based on the quantized ANN information.

10. The method of claim 9, further comprising, on a condition that the output does not meet an acceptability criterion:
    recalculating the distribution of ANN information; and
    reselecting the quantization function from the set of quantization functions based on the recalculated distribution.

11. The method of claim 9, wherein the ANN information comprises a set of training data.

12. The method of claim 9, wherein the ANN information comprises a plurality of link weights.

13. The method of claim 12, further comprising:
calculating a distribution of link weights for each of a plurality of layers of the ANN;
selecting a quantization function to the plurality of link weights for each of the plurality of layers of the ANN based on each distribution; and
applying the respective quantization function to the link weights for each of the plurality of layers.

14. The method of claim 12, further comprising:
calculating a distribution of link weights for each of a plurality of subsets of layers of the ANN;
selecting a quantization function to the plurality of link weights for each of the plurality of subsets of layers of the ANN based on each distribution; and
applying the respective quantization function to the link weights for each of the plurality of subsets of layers.

15. The method of claim 9, further comprising applying a heuristic to the output and a known correct output on a condition that the output does not meet an acceptability criterion, and on a condition that the heuristic is satisfied:
recalculate the distribution of ANN information; and
reselect the quantization function from the set of quantization functions based on the recalculated distribution.

16. The method of claim 9, wherein the different selected quantization function is selected for a group of layers which includes the first layer.

17. A non-transitory computer-readable medium comprising instructions thereon which when executed by a processor configured for adaptive quantization in an artificial neural network (ANN), cause circuitry of the processor to:
calculate a distribution of ANN information;
select a quantization function for each layer of the ANN from a set of quantization functions based on the distribution, wherein a first layer of the ANN has a different selected quantization function than a second layer of the ANN;
apply the quantization function to the ANN information to generate quantized ANN information;
load the quantized ANN information into the ANN; and
generate an output based on the quantized ANN information.

18. The non-transitory computer-readable medium of claim 17, further comprising instructions thereon which when executed by a processor configured for adaptive quantization in an artificial neural network (ANN), cause circuitry of the processor to, on a condition that the output does not meet an acceptability criterion:
recalculate the distribution of ANN information; and
reselect the quantization function from the set of quantization functions based on the recalculated distribution.

19. The non-transitory computer-readable medium of claim 17, wherein the ANN information comprises a set of training data.

20. The non-transitory computer-readable medium of claim 17, wherein the ANN information comprises a plurality of link weights.

21. The non-transitory computer-readable medium of claim 20, further comprising instructions thereon which when executed by a processor configured for adaptive quantization in an artificial neural network (ANN), cause circuitry of the processor to:
calculate a distribution of link weights for each of a plurality of layers of the ANN;
select a quantization function to the plurality of link weights for each of the plurality of layers of the ANN based on each distribution; and
apply the respective quantization function to the link weights for each of the plurality of layers.

22. The non-transitory computer-readable medium of claim 20, further comprising instructions thereon which when executed by a processor configured for adaptive quantization in an artificial neural network (ANN), cause circuitry of the processor to:
calculate a distribution of link weights for each of a plurality of subsets of layers of the ANN;
select a quantization function to the plurality of link weights for each of the plurality of subsets of layers of the ANN based on each distribution; and
apply the respective quantization function to the link weights for each of the plurality of subsets of layers.

23. The non-transitory computer-readable medium of claim 17, wherein the different selected quantization function is selected for a group of layers which includes the first layer.

* * * * *